G. G. SAPP.
COMBINATION COFFEE POT.
APPLICATION FILED AUG. 28, 1915.

1,293,210. Patented Feb. 4, 1919.

Witness:
John Endere

Inventor:
Gordon G. Sapp
by Fred Gerlach
his Atty.

UNITED STATES PATENT OFFICE.

GORDON G. SAPP, OF CHICAGO, ILLINOIS.

COMBINATION COFFEE-POT.

1,293,210.  Specification of Letters Patent.  Patented Feb. 4, 1919.

Application filed August 28, 1915. Serial No. 47,752.

*To all whom it may concern:*

Be it known that I, GORDON G. SAPP, a resident of Chicago, in the county of Cook and State of Illinois, have invented certain new and useful Improvements in Combination Coffee-Pots, of which the following is a full, clear, and exact description.

The invention relates to combination coffee pots.

One object of the present invention is to provide an improved coffee pot which may be used as a percolator, a drip pot, or a boiling pot.

Another object of the invention is to provide an improved combination pot which is simple in construction and which is adapted to be compactly packed for storage or shipment.

The invention consists in the several novel features hereinafter set forth and more particularly defined by claims at the conclusion hereof.

Figure 1:
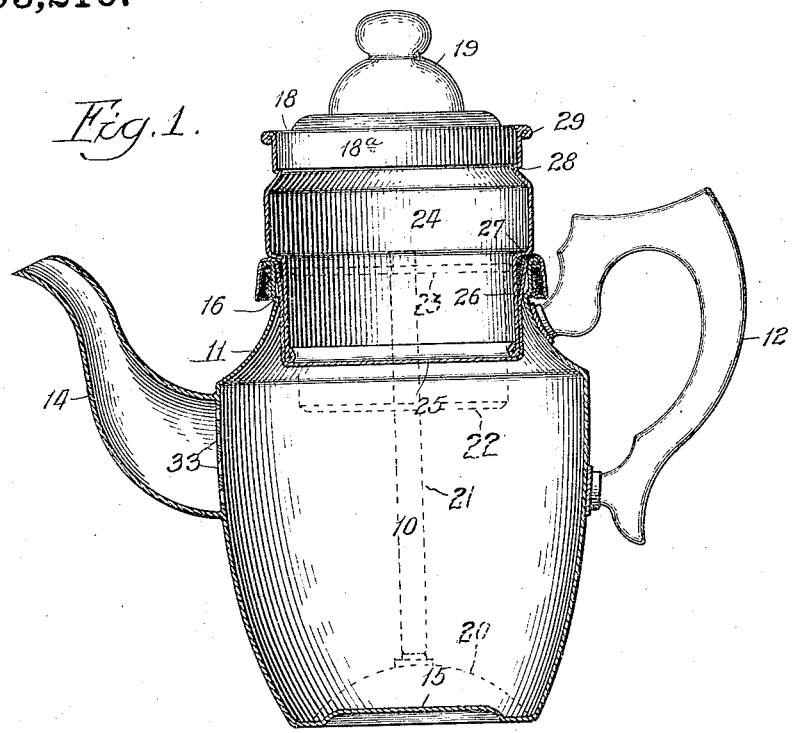
Figure 2:
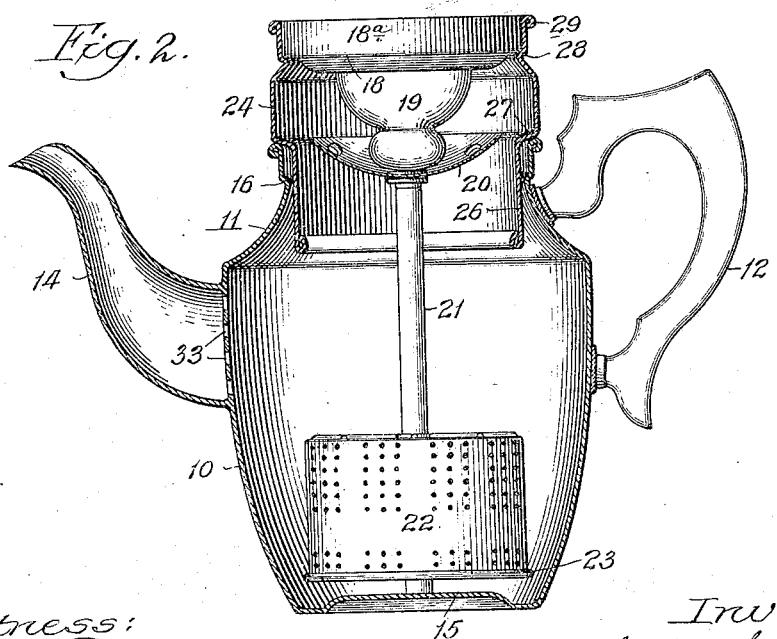

In the drawings: Figure 1 is a vertical section showing the pot for use as a drip pot. Fig. 2 is a section showing the several parts of the pot assembled for storage or shipment.

The improved pot comprises a body 10 provided with a neck 11, a handle 12, a spout 14 and a bottom 15. The neck 11 is provided with a shoulder 16 to hold a cover which consists of an annular metallic rim portion 18 and a glass dome 19. The rim-portion 18 has a flange 18ª fitting in the rim of the neck above shoulder 16. The cover serves to close the top of the body either when the pot is being used as a percolator or when the pot is being used without the percolator. The glass dome serves as a deflector for the liquid forced upwardly through the percolator.

The percolating-device comprises a perforated cone 20 adapted to seat on the bottom 15 of the body, an upright tube 21 and a perforated cup 22 secured to the tube and adapted to contain the coffee. The top of the cup 22 is open and the rim 23 of this cup is adapted to fit within the depending flange of the cover rim 18 and is smaller in diameter than the shoulder 16 so that when the percolator is inverted, the cup can pass to the bottom of body 10. The upper end of tube 21 is extended above the top of the cup 22 to direct the fluid into the dome 19. The percolating device in its entirety is removable from the pot through the top when the cover is removed.

A ring 24 adapted to retain a drip cloth 25 has a reduced lower portion 26 adapted to enter the neck of the body 10 and a shoulder 27 adapted to be supported by the rim of the neck 11. The drip cloth 25 is held, as shown in Fig. 1, across the lower open end of the ring 24 by being folded around the portion 26 of the ring between the shoulder 16 and said portion, and being lapped over the rim of the neck 11. The upper portion of the ring 24 is provided with a shoulder 28 and a rim 29 of substantially the same diameter as the rim and shoulder of the neck 11 of the body, so that the cover will fit into the ring and serve as a cover therefor, as shown in Fig. 1, when the pot is being used as a drip pot. When drip coffee has been made, the ring and cloth may be removed and the cover placed in the neck 11 so that the pot may be used to serve the coffee without the ring. The body 10 is perforated at 33 adjacent the lower end of the spout to serve as a strainer if the pot is used as a boiling pot, that is, without the drip cloth and the percolator.

In shipping or storing the improved pot, it is desirable to avoid packing the parts separately, and to nest the parts together, and for this purpose the parts are formed, as shown in Fig. 2, so that the cone 20 of the percolator, when inverted, will extend up into the ring 24, and so that the cover may be inverted with the glass dome protected in the ring 24, the rim flange of the cover being formed so that it will seat on the shoulder 28 and hold the cover in inverted position in the ring.

The invention thus exemplifies an improved coffee pot which may be used as a percolator, as a drip pot, or as a boiling pot; also one in which the ring for the drip cloth is adapted to receive the cover of the pot when it is being used as a drip pot, and in which the several parts are formed so that the percolator and cover may be inverted and nested for compact packing.

The invention is not to be understood as restricted to the details set forth, since these may be modified within the scope of the appended claims without departing from the spirit and scope of the invention.

Having thus described the invention, what I claim as new and desire to secure by Letters Patent, is:

1. A coffee pot comprising a body provided with a handle and a spout, and having a neck with a shoulder thereon, an invertible cover fitting and supported in the neck and comprising a rim-portion and a dome, a ring for holding a drip cloth having a reduced portion adapted to extend into the body and formed at its upper end with a shoulder and a rim to receive said cover, and an invertible percolating device comprising a tube, a cone and a cup, the lower end of the ring being formed to receive the cone when the percolating device is inverted, the upper end of the ring being formed to receive and hold the inverted cover.

2. In a coffee pot comprising a body provided with a handle and a spout, and having a neck with a shoulder thereon, an invertible cover fitting and supported in the neck and comprising a rim-portion and a dome, a ring for holding a drip cloth, having a portion adapted to extend into the body and formed at its upper end to receive the cover, and an invertible percolating device comprising a tube, a cone and a cup, the lower end of said ring being open so that the cone will pass into the ring when the percolating device is inverted, the ring being formed to hold the dome of the cover in the cone when the cover is inverted in the ring.

GORDON G. SAPP.

Witnesses:
 MILDRED STUMPF,
 KATHARINE GERLACH.